United States Patent [19]

Takacs et al.

[11] Patent Number: 4,884,697

[45] Date of Patent: Dec. 5, 1989

[54] SURFACE PROFILING INTERFEROMETER

[76] Inventors: Peter Z. Takacs, P.O. Box 385, Upton, N.Y. 11973; Shi-Nan Qian, Hefei Synchrotron Radiation Laboratory, University of Science and Technology of China, Hefei, Anhui, China

[21] Appl. No.: 209,549

[22] Filed: Jun. 21, 1988

[51] Int. Cl.$^4$ .............................................. G01B 9/02
[52] U.S. Cl. .................................... 356/360; 356/376
[58] Field of Search ............... 356/345, 351, 353, 360, 356/376

[56] References Cited

U.S. PATENT DOCUMENTS

| | | |
|---|---|---|
| 2,583,596 | 1/1952 | Root . |
| 3,661,463 | 5/1972 | Brainard et al. . |
| 4,027,976 | 6/1977 | Amon . |
| 4,153,370 | 5/1979 | Corey, III . |
| 4,170,401 | 10/1979 | Yoder, Jr. et al. . |
| 4,340,306 | 7/1982 | Balasubramanian ................ 356/360 |
| 4,353,650 | 10/1982 | Sommargren . |
| 4,379,633 | 4/1983 | Bickel et al. . |
| 4,385,835 | 5/1983 | Westerberg . |
| 4,498,773 | 12/1985 | Von Bieren ......................... 356/360 |
| 4,643,576 | 2/1987 | Konah et al. ....................... 356/353 |
| 4,647,206 | 3/1987 | Kunzmann et al. . |

OTHER PUBLICATIONS

Von Bieren, K., "Interferometry of Wavefronts Reflected Off Conical Surfaces," Appl. Opt. 22, 2109 (1983).

Eastman, J. M. and Zavislan, J. M., "A New Optical Surface Microprofiling Instrument," Proc. SPIE 429 (1983).

Sommargren, G. E., "Optical Heterodyne Profilometry," Appl. Opt. 20, 610 (1981).

Hartman, J. S., Gordon, R. L., and Lessor, D. L., "Development of Nomarski Microscopy for Quantitative Determination of Surface Topography," Proc. SPIE 192, 223 (1979).

Kohno, T., Ozawa, N., Miyamoto, M., and Musha, T., "Practical Non-Contact Surface Measuring Instrument With One Nanometre Resolution," Prec. Eng. 7, 231-232 (1985).

Makosch, G. and Solf, B., "Surface Profiling By Electro-Optical Phase Measurements," Proc. SPIE 316, 42 (1981).

Whitefield, R. J., "Noncontact Optical Profilometer," Appl. Opt. 14, 2480-2485 (1975).

Price, R. H., "X-ray Microscopy Using Grazing Incidence Reflection Optics," *Low Energy X-ray Diagnostics*, D. T. Attwood and B. L. Henke, eds., AIP Conference Proc. 75, 189 (1981).

Ennos, A. E. and Virdee, M. S., "High Accuracy Profile Measurement of Quasi-Conical Mirror Surfaces by Laser Autocollimation," Prec. Eng. 4, 5-9 (1982).

DeCew, Jr., A. E. and Wagner, R. W., "An Optical Lever for the Metrology of Grazing Incidence Optics," Proc. SPIE 645, 127-132 (1986).

Church, E. L. and Takacs, P. Z., "Use of an Optical-Profiling Instrument for the Measurement of the Figure and Finish of Optical-Quality Surfaces," Wear 109, 241-257 (1986).

*Primary Examiner*—Davis L. Willis
*Assistant Examiner*—S. A. Turner
*Attorney, Agent, or Firm*—Leonard Belkin

[57] ABSTRACT

The design of a long-trace surface profiler for the non-contact measurement of surface profile, slope error and curvature on cylindrical synchrotron radiation (SR) mirrors. The optical system is based upon the concept of a pencil-beam interferometer with an inherent large depth-of-field. The key feature of the optical system is the zero-path-difference beam splitter, which separates the laser beam into two colinear, variable-separation probe beams. A linear array detector is used to record the interference fringe in the image, and analysis of the fringe location as a function of scan position allows one to reconstruct the surface profile. The optical head is mounted on an air bearing slide with the capability to measure long aspheric optics, typical of those encountered in SR applications. A novel feature of the optical system is the use of a transverse "outrigger" beam which provides information on the relative alignment of the scan axis to the cylinder optic symmetry axis.

14 Claims, 2 Drawing Sheets

SURFACE PROFILING INTERFEROMETER

The Government has rights in this invention pursuant to contract No. DE-AC02-76CH00016 awarded by the U.S. Department of Energy.

BACKGROUND OF THE INVENTION

This invention relates to instruments to measure the profile of large, smooth optical-quality surfaces and more particularly to such instruments utilizing pencil beam interferometry.

The design and fabrication of exotic, unconventional optical components have advanced beyond the capability of traditional metrology techniques to measure and qualify those components. Single-point diamond turning techniques have improved significantly over the past few years so that optical components whose size and shape could not have been imagined just a few years ago are now integral parts of advanced optical systems.

The proliferation of synchrotron radiation sources of high intensity soft x-rays over the past several years, and advances in x-ray laser and short wavelength free electron laser technologies have spurred the development of industries producing far off-axis aspheric optics, such as cylinders and toroids, for extreme grazing incidence applications. For example, optical components employed in the design of synchrotron radiation beamlines are almost without exception used at extreme grazing incidence in order to reflect x-rays with energies in the 1 to 20 kilovolt range. Grazing angles of 10 mrad or less are typical and the surface figures often are plane cylinders, toroids, ellipsoids, and plane surfaces bent into the shape of a toroid or ellipsoid. The tolerances on mirrors such as these are such that slope errors must be measured to better than a arc second in precision and accuracy over a wide range of surface spatial periods.

The surface roughness of mirrors such as those mentioned above is measured in many laboratories with optical profilers which cover the spatial period range typically from 3 microns up to 5 mm. What has been lacking up to now is an instrument capable of measuring surface profile or slope over the mid-to low-frequency range, covering spatial periods from 1 mm up to the full mirror length of 1 meter, in a non-contact manner. The fabrication community and the end user community have been hampered by the lack of suitable metrology instrumentation for rapid assessment of the surface figure of large aspheric optical components.

Conventional interferometric testing of large or aspheric optics, using commercially-available systems, is often not possible or requires an enormous expenditure of resources to develop a facility to fabricate null lens components, e.g., a computer-generated hologram, that in itself requires a complete qualification program. These auxiliary components are usually specific to a single optical element under test and cannot be modified to accommodate changes in the final component design without the need to generate a completely new auxiliary component. It is thus difficult to take advantage of the ability of the precision machining process to rapidly accommodate changes in the design parameters of the optics.

Other scanning instruments based on different optical principles already exist, some as commercial products, for example, as described in Eastman, J. M. and Zavislan, J. M., "A New Optical Surface Microprofiling Instrument," Proc. SPIE 429 (1983); and Sommargren, G. E., "Optical Heterodyne Profilometry," Appl. Opt. 20, 610 (1981), but each has one or more specific drawbacks limiting substantially its possible use for lens systems described above.

A number of non-contact optical scanning profilers are available and the majority can be categorized into two basic types: (1) those based on probe beams that are focussed onto the test surface, such as Eastman et al identified above, and Hartman, J. S., Gordon, R. L., and Lessor, D. L., "Development of Nomarski Microscopy for Quantitative Determination of Surface Topography," Proc. SPIE 192, 223 (1979); Kohno, T., Ozawa, N., Miyamoto, M., Musha, T., "Practical Non-Contact Surface Measuring Instrument With One Nanometre Resolution," Prec. Eng. 7, 231–232 (1985); Makosch, G. and Solf, B., "Surface Profiling By Electro-Optical Phase Measurements," Proc. SPIE 316, 42 (1981).; and Whitefield, R. J., "Noncontact Optical Profilometer," Appl. Opt. 14, 2480–2485 (1975); and (2) optical lever devices that sense the angular change of a probe beam reflected from a test surface, such as Price, R. H., "X-ray Microscopy Using Grazing Incidence Relection Optics," Low Energy X-ray Diagnostics, D. T. Attwood and B. L. Henke, eds., AIP Conference Proc. 75, 189 (1981); Ennos, A. E. and Virdee, M. S., "High Accuracy Profile Measurement of Quasi-Conical Mirror Surfaces by Laser Autocollimation," Prec. Eng. 4, 5–9 (1982); and DeCew, Jr., A. E. and Wagner, R. W., "An Optical Lever for the metrology of Grazing Incidence Optics," Proc. SPIE 645, 127–132 (1986).

Instruments based on focussed probe beams suffer from a limited depth of field, which place severe restrictions on the type of surface that can be measured. Surfaces must be nearly flat, since any slight curvature will cause the position of the surface to exceed the depth of field of the microscope objective. This problem is especially acute on large optical components where even a slight curvature results in a large sag in the center of the optics. Even flat surfaces need to be levelled with great precision so that residual tilt will not cause the surface to exceed the depth of field over long distance.

One method to circumvent the depth-of-field problem is to use an auxiliary metrology system to measure the amount of vertical travel required to refocus the optical head, but this method adds an unwarranted degree of complexity to the problem. To our knowledge this has not been implemented in any of the focussed-beam scanning devices.

The class of profilers based on optical lever principles do not suffer from depth of field problems, since the probe beams are generally unfocussed laser beams, but they share with the microscope-based systems a practical limitation related to the ability of the operator to align the scan axis of the profiler with the symmetry axis of the components in the form of cylinders with minor radii on the order of tens of centimeters or less.

In recent years this problem has been addressed by newly developed optical systems, many of them employing highly coherent, or laser, beam technology, such as for example the so-called pencil beam interferometer. A typical pencil beam interferometer employs a single laser beam split into two colinear beams which are then reflected off of an optical surface. The reflected beams are made to recombine and produce an interference pattern in the focal plane of a Fourier transform lens. Analysis of the interference pattern as the interferometer is traversed across the optical surface yields information on the overall shape of the surface and deviations of the surface from the ideal shape.

A pencil beam interferometer is shown in U.S. Pat. No. 4,498,773 to von Bieren of the type to which this invention relates. The paths which the split beams follow in the patent are not exactly of the same length (i.e., not zero path difference) and in fact the design in the patent is inherently incapable of obtaining the zero path difference with the consequence that a coherent beam, such as a laser beam, is required, and the apparatus is highly sensitive to wind, changes in temperature, and vibration since these conditions will alter the beam lengths differentially. In addition, where alignment of the mirror being analyzed is required, von Bieren does not have any way to utilize the pencil beams to effect this alignment so that other apparatus must be employed for this purpose.

Other U.S. Patents related in subject matter are 2,583,596, 3,661,463, 4,027,976, 4,153,370, 4,170,401, 4,353,650, 4,379,633, 4,385,835, 4,643,576, and 4,647,206.

None of the aforementioned patents is capable of producing the alignment and rapid assessment of the surface figure of large aspheric optical components with the speed and degree of precision required.

SUMMARY OF THE INVENTION

The present invention makes it possible to measure rapidly and with a high degree of precision the profiles of highly polished optical surfaces which may be in the form of large cylindrical-shaped optical components.

This invention addresses the need for an optical metrology tool with interferometric accuracy that can be used to measure a wide variety of optical surfaces without the need for expensive, difficult-to-manufacture null lens components. It is an improvement on the pencil-beam interferometer disclosed in the patent to von Bieren, (U.S. Pat. No. 4,498,773) previously identified and the patentee's paper "Interferometry of Wavefronts Reflected Off Conical Surfaces," Appl. Opt. 22, 2109 (1983).

Briefly described, the present invention utilizes an incident beam split into two colinear parts by a beam splitter/prism arrangement, which are directed down to the test surface. The reflected beams are made to interfere at the focus of a Fourier transform lens and the interference pattern is magnified and projected onto a linear array detector. The part to be measured is placed under the optical head and remains stationary while the optical head moves along a high-precision linear air bearing slide.

Another feature of this invention is an optical arrangement which will permit the separation distance of the two colinear parallel pencil beams to be varied from zero to several millimeters while maintaining the zero optical path difference between the beams which is a critical aspect of this invention.

This invention also provides a means to align optical components to the scan axis through the use of "outrigger" beams. Outrigger beams are generated within the optical head that are colinear with the two measurement beams, but displaced in the direction transverse to the scan. By selecting the proper pair of probe beams one can determine with proper analysis the degree of rotation of the test optic relative to the scan direction by making one or two alignment scans and thus correct the rotation angle. This technique offers significant improvement over the trial-and-error scanning method for systems that have no inherent alignment sensing system. The savings in time to perform the test are enormous with this type of system.

The principle advantage of the use of the outrigger beams is to reduce the difficulty or complexity usually involved in aligning the symmetry axis of a cylinder mirror with the scan axis. Because the radius of curvature in the transverse direction is often on the order of centimeters, while the radius in the longitudinal direction is hundreds of meters, any slight angular rotation of the test mirror relative to the scan axis will introduce a significant amount of coupling between the two radii. Since the use of this invention has particular usefulness to measure the absolute curvature along the longitudinal axis, coupling of the minor radius into the measurement is unacceptable. The outrigger beams work on the same principle as the main probe beams, only it provides slope information in the transverse direction.

The outrigger beams are obtained, in a preferred embodiment of this invention, by a second beam splitter cube located below the main beam splitter. A mask is utilized to select one of the main beams and one of the outrigger beams to propagate through the system. The detector is rotated 90 degs. to detect the fringes within the focal spot, and the slope values are computed at a few points along the length of an alignment scan. If the mirror is not exactly aligned along the scan axis, the relative slopes will change in a predictable manner along the length of the traverse. Knowing the approximate major and minor radii of the mirror under test, it is then possible to compute the approximate rotation angle or the cylinder and rotate the mirror to align it exactly with the scan axis. One or two more rapid iterations of this process allows one to quickly align the test mirror without the need for time-consuming trial-and-error scans with the main beams. One can iterate this process as many times as is necessary to achieve the desired tolerance. If desired a second detector may be added to the system to eliminate the need to rotate the main detector.

In accordance with a preferred embodiment of this invention there is provided a linear air slide on which the optical system is mounted above and facing the optical segment to be tested and aligned with each other. The air slide may be mounted on a vertical column where the mirror is positioned vertically.

It is thus a principal object of this invention to provide measurement of the surface of a highly polished optical surface minimizing the effects of temperature, air turbulence and vibration.

Other objects and advantages of this invention will hereinafter become obvious from the following detailed description of preferred embodiments of this invention.

BRIEF DESCRIPTION OF THE FIGURES

FIG. 3 is a plan view of the mask which may be employed with the system shown in FIG. 2.

DETAILED DESCRIPTION OF THE PREFERRED EMBODIMENTS

Figure 1:
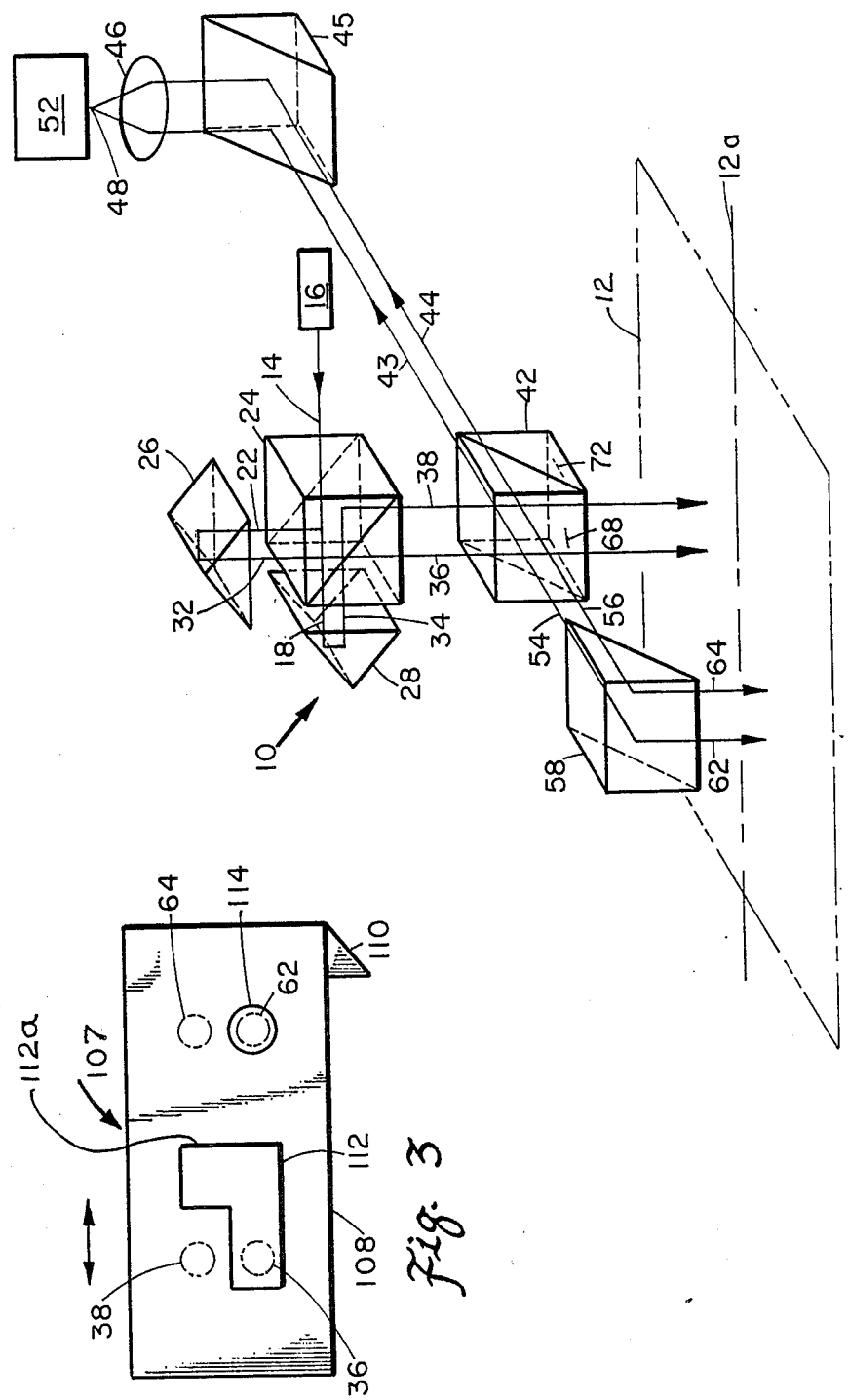
FIG. 1 is the schematic of an interferometer for measuring optical surfaces incorporating the principles of this invention.

Referring to FIG. 1, interferometer 10 is arranged to obtain a non-contact measurement of the surface profile, slope error, and curvature of mirror 12 shown in phantom.

Mirror 12 is aspheric of the type used in a synchrotron radiation beamline although interferometer 10 can be used with any highly polished optical surface. Numeral 12a indicates the long axis of mirror 12 along which the profile is measured.

Laser beam 14 produced by laser 16 is split into two pencil beams 18 and 22 at right angles to each other by a cube beam splitter 24, and are then reflected and laterally displaced by right angle prisms 28 and 26, respectively. The displaced beams 32 and 34 pass through and are reflected downwardly, respectively, as illustrated, forming two probe beams 36 and 38 which are directed down to the test surface on mirror 12 through beam splitter 42 and reflected back by mirror 12 into beam splitter 42, forming a pair of beams 43 and 44 which are directed into a rear right angle prism 45 which reflects beams 43 and 44 up through the Fourier transform (FT) lens 46. The image at focus 48 of the FT lens 46 is then projected onto a linear array detector 52. Lens 46 and detector 52 are conventional the details of which form no part of this invention. Laser 16 may be any commercially available device. Detector 52 is rotatable 90 degrees for a purpose to be described below.

The separation of beams 36 and 38 along the long axis 12a of mirror 12 typically is the width of one beam, for example 1 mm., but may be increased if desired, depending on the particular application. The separation distance can be varied without affecting the zero path difference by the relative translation of prisms 26 and 28.

Beam splitter 42 also generates outrigger beams 54 and 56 which are directed as beams 62 and 64 to the surface of mirror 12 by right angle prism 58. Beams 62 and 64 are also spaced in the direction along the long axis 12a of mirror 12 but are offset from beams 36 and 38 at right angles to axis 12a. As will be described in connection with FIG. 3, a mask is employed to select the appropriate pair of beams for either a test or alignment scan. A typical pair of beams for the alignment could be beams 38 and 64 which as noted are displaced at right angles to axis 12a of lens 12. Prism 58 is tiltable so that the outrigger beam 62, for example, being used, will be at right angles to the surface of mirror 12 at the point to which it is directed.

It will be noted that in the system shown in FIG. 1 there is inherently a zero path difference between parallel or split beams. That is, regardless of the separation between split beams obtained, the total path traversed by each beam can be maintained equal or any difference, if desired, can be controlled by the relative translation of right angle prisms 26 and 28, so that if desired, a predetermined path difference can be introduced. The zero path difference, however, reduces the susceptibility of the instrument to errors induced by air path variations and allows one to use a frequency-unstabilized laser and consequently for the purposes of this invention the zero path difference is normally maintained. Separation between the two primary probe beams 36 and 38 can be adjusted from zero separation up to several millimeters in order to optimize the sampling period on the surface, and the beam spot size can be adjusted by insertion of an appropriate lens system before the primary beam splitter 24, if desired.

Figure 2:
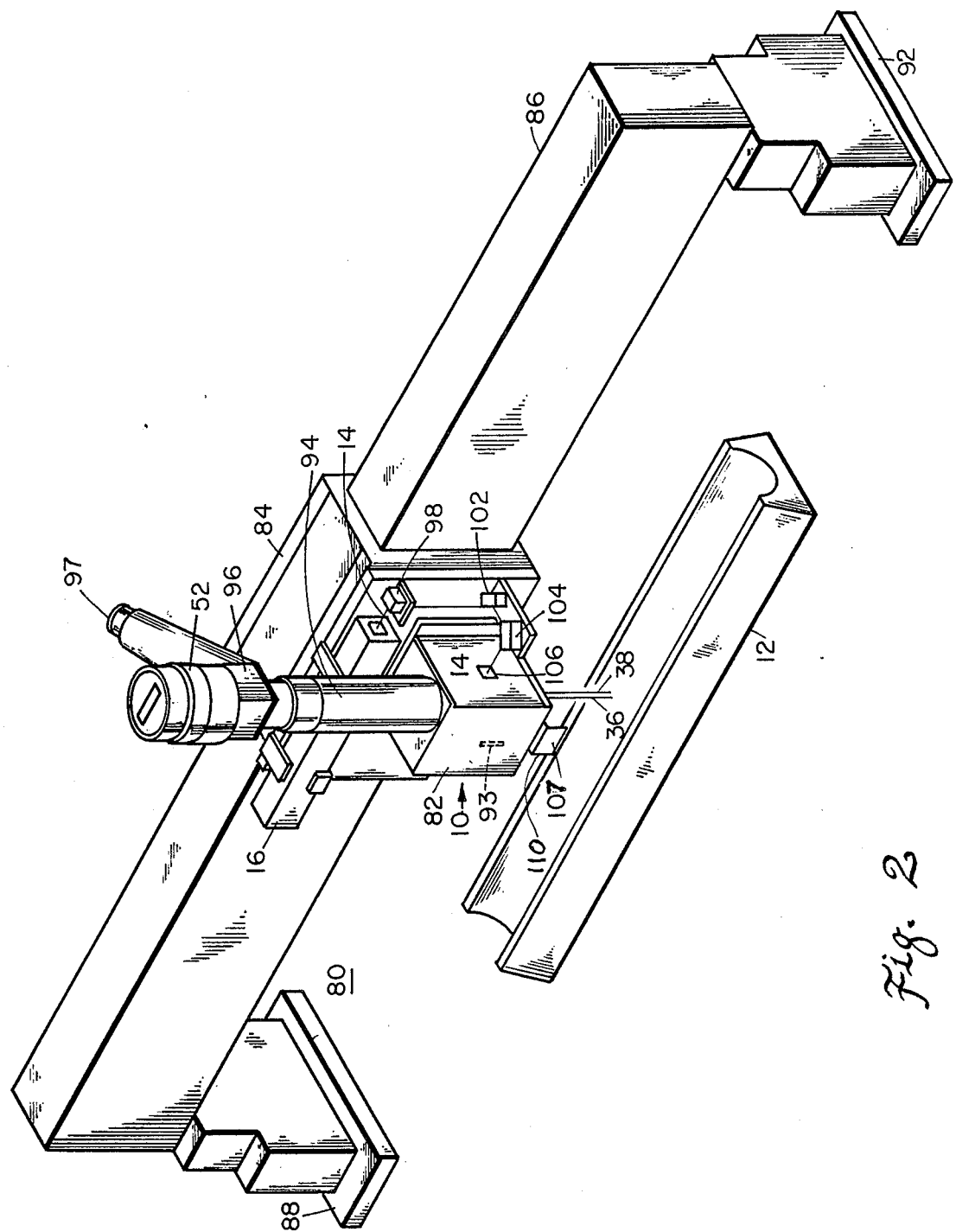
FIG. 2 is an isometric view in partially schematic form of a typical mounting system for the lens system shown in FIG. 1 along with a typical cylindrical mirror of the type requiring exact alignment of the mirror prior to undertaking of its profile.

Referring to FIG. 2, there is illustrated a mounting system 80 for interferometer 10 the lens system of which is contained within a housing 82 which is mounted on an air slide 84 riding on an air slide bar 86 supported horizontally on pedestals 88 and 92. Prism 58 is supported for rotation within housing 82 and a knurled pin 93 extending down under housing 82 is utilized to change manually its angle of orientation. Air slide 84 may be moved along bar 86 utilizing a worm gear arrangement (not shown) internal to bar 86 which may be either manually rotated or powered by an electric motor. The means of moving slide 84 is not a part of this invention.

Extending up from housing 82 is a microscope tube 94 on the top of which is a connecting piece 96 topped by detector 52. An eye piece 97 permits the interference pattern to be visually observed.

Also mounted on slide 84 is laser 16 which directs its beam 14 to a mirror 98 which redirects the beam through mirrors 102 and 104 into housing 82 through an opening 106 where the beam is received by beam splitter 24 as shown in FIG. 1.

Beam splitters 24 and 42, and reflecting mirrors 26, 28, 45 and 58 shown schematically in FIG. 1 are contained within housing 82.

As seen in FIG. 2, beams 36 and 38 emerge from the underside of housing 82 to be reflected by mirror 12 undergoing test. Beams 36 and 38 are separated, are directly above, and aligned along the length of mirror 12 directly above axis 12a and so are directed at right angles to the tangent of the mirror 12 at the points where they meet the mirror surface thereby insuring that they are reflected back along the same lines.

In order to utilize an outrigger beam, such as beam 62 to align mirror 12, a mask slide 107 is shown mounted on the underside of housing 82.

As seen in FIG. 3, mask slide 107 consists of a flat plate 108 with a bent piece 110 at one end to act as a handle. Plate 108 has an L-shaped opening 112 and a circular opening 114.

Shown in phantom are main beams 36 and 38, and outrigger beams 62 and 64. In the position of slide 106 illustrated in FIG. 3, it will be seen that main beam 36 and outrigger beam 62 pass through openings 112 and 114, respectively, so that mirror 12 is being checked for alignment. Thus, slide 106 is in the OUT position in FIG. 3, while, referring to FIG. 2, slide 106 there is shown in the IN position. If slide 106 is pushed in (to the left in FIG. 3) then both outrigger beams 62 and 64 would be blocked and both main beams 36 and 38 would pass through on the leg 112a of L-shaped opening 112, system 10 then being used in the test scan. The double headed arrow in FIG. 3 shows the direction of movement of slide 106.

In the operation of the apparatus just described it is necessary first to obtain the alignment of mirror 12 so that slide 84 moves along directly above central axis 12a. Mirror 12 is initially aligned visually. Then mask slide 107 is moved into its OUT position shown in FIG. 3 where beams 36 and 62 are passed through to mirror 12. In order to insure that beam 62, which is offset from beam 36 at right angles to axis 12a, reaches the surface of mirror 12 at right angles to the tangent at the point of contact, mirror 58 using knurled pin 93 is tilted manually until an interference pattern is clearly observed through eyepiece 97. This indicates that beams 36 and 62 reaching detector 53 are superimposed on each other. Then slide 84 is moved along the length of bar 86. If the interference or fringe pattern does not move during the course of the movement of slide 84 then mirror 12 is properly aligned.

To go into the test or measurement scan or mode of mirror 12, mask slide 107 is moved into its IN position where beams 36 and 38 are passed through and beams 62 and 64 are blocked.

It should be noted at this point that in the alignment mode the two beams being used to form the interference pattern are displaced at right angles to axis 12a of mirror 12 whereas during the test scan the two beams are spaced along axis 12a, hence, the two sets of beams are angularly displaced by 90 degrees. For this reason, when going from the alignment mode to the test mode it is necessary to rotate detector 53 by 90 degrees, as detector 53 can measure only in one direction.

The intensity of the interference pattern is read out several times and averaged after each translation of air slide 84. The minima in the interference pattern is located by a curve-fitting routine at each step to within a fraction of a pixel, and from this data the local slope and surface height profile are reconstructed. The interference pattern produced in the focal plane of the Fourier transform lens is projected onto detector 53 with a 10 X microscope objective (not shown) located under detector 52. A suitable detector is a 3456 element CCD array with a 7 micron pixel spacing. The present design parameters produce an angular resolution of about 1.7 arc seconds per pixel, but by curve fitting and averaging frames it is possible to improve significantly on the precision of the measurement.

This design of the long-trace profiler can accommodate a total surface angular slope range of +10 mrad, which translates into a sag of 5 mm over a surface which is in length 1 meter long.

A system of the type shown in FIGS. 1 and 2 was constructed and operated successfully employing a large Dover Model 850 linear air slide which is very stable and has an expected angular repeatability of better than 0.1 arc second.

The aspheric mirror was a 50 cm. long toroid with a major radius of 1.2 km and a minor radius of 10.7 mm to be used at a grazing incidence angle of 3 mrad. The mirror substrate was reaction bonded SiC with a CVD SiC coating. The figured surface was polished into the CVD material and then coated with rhodium to enhance the reflectance of 20 KeV x-rays.

The laser employed was a polarized 5 milliwatt heliumneon laser available commercially from different sources.

While only certain preferred embodiments of this invention have been described it is understood that many variations are possible without departing from the principles of this invention as defined in the claims which follow.

What is claimed is:

1. An interferometer for profiling the surface along one axis of an optical surface comprising:
   a. an incoming light beam;
   b. first beam splitter means optically oriented to receive and to split said incoming light beam into first and second pencil light beams;
   c. first reflector means to reflect back into said first beam splitter means the first pencil light beam;
   d. second reflector means to reflect back into said first beam splitter means the second pencil light beam;
   e. said first beam splitter means including means to direct outwardly said first and second pencil light beams parallel to and laterally displaced from each other along said axis;
   f. second beam splitter means for receiving from said first beam splitter means and passing through said first and second pencil beams toward said optical surface, said optical surface being oriented to reflect said first and second pencil beams back to said second beam splitter means;
   g. said second beam splitter means including means to redirect the reflected first and second pencil beams away from said first beam splitter means;
   h. means to receive the redirected first and second pencil beams and form an interference pattern from said redirected first and second pencil beams to represent the profile of said optical surface; and
   i. said first and second reflector means being positioned to obtain a predetermined path difference between said first and second parallel beams from said first beam splitter means to said optical surface.

2. The interferometer of claim 1 in which said predetermined path difference is zero.

3. The interferometer of claim 2 in which said first and second reflector means are right angle prisms.

4. The interferometer of claim 3 in which said first and second beam splitter means are cubes.

5. The interferometer of claim 1 in which said light beam is a laser beam.

6. The interferometer of claim 1 wherein lateral separation of said redirected first and second pencil beams is adjustable by the relative translation of said first and second reflector means.

7. An interferometer for aligning and profiling the surface of an aspheric optical surface along an axis of said surface comprising:
   a. an incoming light beam;
   b. first beam splitter means optically oriented to receive and to split said incoming light beam into first and second pencil light beams;
   c. first reflector means to reflect back into said first beam splitter means the first pencil light beam;
   d. second reflector means to reflect back into said first beam splitter means the second pencil light beam, said first and second reflector means being positioned to obtain a zero path difference;
   e. said first beam splitting means including means to direct the reflected first and second pencil light beams parallel to and displaced from each other;
   f. second beam splitting means to receive and split said parallel pencil beams from said first beam splitting means to produce a first pair of spaced parallel beams directed toward said axis and at least one beam offset from one of said spaced a parallel beam from which said offset beam is split transversely to said axis, and means to reflect said offset beam to said surface displaced from said axis, said surface reflecting back along the same path said directed beams;
   g. blocking means for alternatively unblocking either said pair of spaced parallel beams or said offset beam and the spaced parallel beam from said which said offset beam was split; and
   h. means for receiving the reflected offset beam and its spaced parallel beam for aligning said surface and for receiving the reflected spaced parallel beams for profiling the surface of said surface in accordance with the position of said blocking means.

8. The interferometer of claim 7 in which said first and second reflector means are right angle prisms.

9. The interferometer of claim 8 in which said first and second beam splitter means are cubes.

10. The interferometer of claim 7 wherein separation of said redirected first and second pencil beams is adjustable by the relative translation of said first and second reflector means.

11. The interferometer of claim 7 in which said predetermined path difference is zero.

12. The interferometer of claim 7 in which said means to reflect said offset beam is adjustable to direct said offset beam at right angles to said surface where said offset beam is reflected.

13. A method of profiling the surface of an aspheric optical surface having a first axis along which said profile is to be taken comprising the steps of splitting an incoming light beam into first and second pencil light beams, reflecting said pencil light beams utilizing zero path difference reflectors to form a pair of spaced beams, directing said spaced beams at said surface along said axis to said surface where said spaced beams are reflected back, and forming an interference pattern from the reflected beams to represent the profile of said optical surface.

14. The method of claim 13 wherein at least one of said spaced beams is split and displaced from said axis for reflection by said surface to form an interference pattern with said one of said spaced beams reflected from said surface to obtain axial alignment of said mirror.

* * * * *